US012686372B2

(12) United States Patent
Berglund et al.

(10) Patent No.: US 12,686,372 B2
(45) Date of Patent: Jul. 21, 2026

(54) METHOD AND CONTROL ARRANGEMENT FOR CONTROLLING A BRAKE SYSTEM IN A VEHICLE

(71) Applicant: Scania CV AB, Södertälje (SE)

(72) Inventors: Martin Berglund, Vagnhärad (SE); Daniel Ståhl, Enköping (SE); Karl Vestgöte, Nyköping (SE)

(73) Assignee: Scania CV AB, Södertälje (SE)

( * ) Notice: Subject to any disclaimer, the term of this patent is extended or adjusted under 35 U.S.C. 154(b) by 58 days.

(21) Appl. No.: 18/748,486

(22) Filed: Jun. 20, 2024

(65) Prior Publication Data

US 2025/0001990 A1     Jan. 2, 2025

(30) Foreign Application Priority Data

Jun. 27, 2023     (SE) .................................... 2350788-2

(51) Int. Cl.
   *B60T 13/66*          (2006.01)
(52) U.S. Cl.
   CPC ......... *B60T 13/662* (2013.01); *B60T 2210/10* (2013.01)
(58) Field of Classification Search
   CPC ....... B60T 13/662; B60T 2210/10; B60T 7/22
   See application file for complete search history.

(56) References Cited

U.S. PATENT DOCUMENTS

| | | | | |
|---|---|---|---|---|
| 6,289,281 B1* | 9/2001 | Shinmura | ................. | B60T 7/22 |
| | | | | 701/72 |
| 6,902,241 B2* | 6/2005 | Yamamoto | .............. | B60T 8/246 |
| | | | | 303/146 |
| 10,688,871 B2* | 6/2020 | Shimizu | .............. | B60L 15/2009 |
| 2002/0121807 A1* | 9/2002 | Sakata | ...................... | B60T 7/22 |
| | | | | 303/155 |

(Continued)

FOREIGN PATENT DOCUMENTS

| | | |
|---|---|---|
| EP | 3321144 A1 | 5/2018 |
| SE | 529945 C2 | 1/2008 |

(Continued)

OTHER PUBLICATIONS

SCANIA CV AB, Swedish Patent Application No. 2350788-2, Office Action, Feb. 2, 2024.

*Primary Examiner* — Joseph J Dallo
(74) *Attorney, Agent, or Firm* — Moore & Van Allen PLLC; W. Kevin Ransom

(57)          ABSTRACT

A method to control a brake system in a vehicle, the vehicle comprising an auxiliary brake system configured to apply a brake force to at least one first wheel of the vehicle and a foundation brake system configured to apply a brake force to at least one second wheel of the vehicle. The method comprises, when a first brake force is or is to be applied to the vehicle by means of the auxiliary brake system and when an indication of an instability condition associated with a coming road section is detected initiating a transfer of at least a part of the first brake force applied to the vehicle by (Continued)

the auxiliary brake system to, instead, be applied by the foundation brake system prior to reaching the coming road section to overcome the detected instability condition, such that applied brake force may be distributed over additional wheels to increase stability.

18 Claims, 6 Drawing Sheets

(56)                    References Cited

U.S. PATENT DOCUMENTS

| | | | |
|---|---|---|---|
| 2009/0281704 A1* | 11/2009 | Otake | B60T 7/22 |
| | | | 701/96 |
| 2010/0312447 A1 | 12/2010 | Perkins | |
| 2012/0049617 A1* | 3/2012 | Furuyama | B60T 13/662 |
| | | | 303/9.75 |
| 2012/0212043 A1* | 8/2012 | Miyata | B60T 7/042 |
| | | | 303/9.62 |
| 2014/0324316 A1 | 10/2014 | Yao et al. | |
| 2015/0001919 A1* | 1/2015 | Murayama | B60T 13/662 |
| | | | 303/14 |
| 2015/0210256 A1* | 7/2015 | Yamashita | B60T 13/662 |
| | | | 303/14 |
| 2015/0329090 A1* | 11/2015 | Watanabe | B60T 13/662 |
| | | | 701/93 |
| 2016/0016565 A1 | 1/2016 | Gabor et al. | |
| 2016/0236672 A1 | 8/2016 | Yanagida et al. | |
| 2018/0162332 A1* | 6/2018 | Nakazawa | B60T 7/22 |
| 2018/0229705 A1 | 8/2018 | Farres et al. | |
| 2018/0236989 A1* | 8/2018 | Lian | B60T 8/172 |
| 2018/0354476 A1 | 12/2018 | Tagesson | |
| 2019/0248349 A1* | 8/2019 | Wulf | B60W 10/184 |
| 2019/0329748 A1* | 10/2019 | Kawakami | B60T 8/368 |
| 2020/0324747 A1* | 10/2020 | Risch | B60T 8/1755 |
| 2021/0221354 A1* | 7/2021 | Jin | B60T 8/243 |
| 2022/0055589 A1* | 2/2022 | Kimura | B60T 11/16 |
| 2022/0178686 A1 | 6/2022 | Suzuki et al. | |
| 2022/0289155 A1* | 9/2022 | Lee | B60T 8/885 |

FOREIGN PATENT DOCUMENTS

| | | |
|---|---|---|
| WO | 2007139488 A1 | 12/2007 |
| WO | 2021105388 A1 | 6/2021 |
| WO | 2021115566 A1 | 6/2021 |

* cited by examiner

Figure 1

METHOD AND CONTROL ARRANGEMENT FOR CONTROLLING A BRAKE SYSTEM IN A VEHICLE

CROSS-REFERENCE TO RELATED APPLICATIONS

This application claims priority to Swedish Patent Application No. 2350788-2 filed Jun. 27, 2023, of the same title; the contents of which are hereby incorporated by reference.

TECHNICAL FIELD

The present disclosure relates in general to a method and a control arrangement for controlling a brake system in a vehicle. More specifically, the present disclosure relates to controlling the vehicle brake system when an instability condition is detected. The present disclosure also relates to a computer program and a computer-readable medium and a vehicle comprising such a control arrangement.

BACKGROUND

The following background description constitutes a description of the background to the present disclosure, which does not, however, necessarily have to constitute prior art.

Modern vehicles, including heavy motor vehicles, such as trucks and busses, are today commonly provided with one or more speed control systems controlling the speed of the vehicle.

Modern vehicles, including heavy motor vehicles, such as trucks and busses, are today commonly provided with a plurality of brake systems configured to efficiently and safely decrease the vehicle speed or brake the vehicle when required. Heavy vehicles, typically utilize a foundation brake system such as a wheel brake as their primary brakes. A primary brake may be activated manually by the vehicle operator or automatically by a brake system controller. However, due to the specific brake force demands of heavy vehicles, the primary brake system may be supplemented by one or more auxiliary brakes. These additional brakes enhance safety, control, and overall braking performance, particularly during situations when there is a risk that the primary brake system may become overheated, less efficient and/or undergo excessive wear.

Such situations may arise when the brake force demand is high during an extended time period, such as descending downhill road sections. Auxiliary brakes help manage the increased strain on the primary brakes, extend their service life, and improve the vehicle's ability to maintain a safe speed.

SUMMARY

It is an objective of the present disclosure to provide methods and control arrangements for mitigating or solving drawbacks of conventional solutions.

The object is achieved by the subject-matter of the appended independent claim(s).

According to a first aspect of the present disclosure, the object is achieved by a method for a control arrangement configured to control a brake system in a vehicle, the vehicle comprising an auxiliary brake system configured to apply a brake force to at least one first wheel of the vehicle and a foundation brake system configured to apply a brake force to at least one second wheel of the vehicle, the method comprising, when a first brake force is or is to be applied to the vehicle by means of the auxiliary brake system and when an indication of an instability condition associated with a coming road section is detected:

initiating a transfer of at least a part of the first brake force applied to the vehicle by the auxiliary brake system to, instead, be applied by the foundation brake system prior to reaching the coming road section to overcome the detected instability condition.

Examples of auxiliary brake systems include, but is not limited to, various engine brake systems, such as compression release brake or an exhaust brake, and a retarder brake system. Another example of an auxiliary brake system is a regenerative brake system allowing, in conventional way, the vehicle to recover and convert some of the kinetic energy produced during braking into electric energy.

The first brake force may, in an embodiment, correspond to a total required brake force in the coming road section. In an embodiment, the total required brake force may instead comprise a further brake force applied by the foundation brake system. Thus, the total required brake force may be applied by one of more brake systems in the coming road section. The total require brake force may be applied in the coming road section to reduce the speed of the vehicle or to maintain a required speed, e.g., on a downhill road.

The instability condition associated with an upcoming road section may here relate to a road condition ahead of the vehicle which, if the first brake force is applied to the vehicle by means of the auxiliary brake system, may lead to an undesired event impacting the stability of the vehicle. Such an undesired event may involve loss of traction between one or more wheels and the road surface which may reduce the brake efficiency and increase the risk of loss of control over the vehicle.

By initiating a transfer of at least a part of the first brake force applied to the vehicle by the auxiliary brake system to, instead, be applied by the foundation brake system prior to reaching the upcoming road section the applied brake force may be distributed over additional wheels and thereby increase the stability of the vehicle. Hereby, the risk of vehicle instability is reduced prior to the occurrence of the instability situation.

In an embodiment of the present disclosure, the instability condition is based on a vehicle operating parameter.

The vehicle operating parameter may refer to various conditions and parameters that affect the operation and performance of the vehicle and relate to the vehicle speed, brake status, vehicle mass, tire pressure, wheel traction to mention a few. These operating parameters may be monitored by the vehicle's onboard sensors and systems and maintained within their specified operating ranges. Operating parameters outside of such operating ranges may lead to unwanted vehicle behavior such as vehicle instability. Hereby, an instability condition may be detected or estimated in the vehicle in an accurate and reliable way.

In an embodiment of the present disclosure, the initiating of the transfer of the brake force comprises:

controlling the auxiliary brake system to gradually reduce the applied first brake force while controlling the foundation brake system to apply a gradually increased brake force.

Since the brake force applied by means of the auxiliary brake system is reduced gradually while the brake force applied by means of the foundation brake system is increased gradually, the above described redistribution of the brake force may be performed in a smooth and controlled way. Such brake force redistribution may not even be noticeable since the instability condition will be avoided in a controlled manner.

In an embodiment of the present disclosure, the auxiliary brake system is controlled to gradually reduce the applied first brake force to a second brake force such that the second brake force is applied prior to or when reaching the coming road section, the method further comprising prior to or when reaching the coming road section:

controlling the auxiliary brake system to apply the second brake force, and controlling the foundation brake system to apply a brake force such that a total requested brake force is applied to the vehicle.

Hereby, the total requested brake force is applied to maintain a required vehicle speed. Moreover, the applied brake power is redistributed over additional wheels already when the coming road section has been reached preventing the risk for instable vehicle behavior.

In an embodiment of the present disclosure, wherein the foundation brake system is further configured to apply a brake force to the at least one first wheel.

Hereby, the total brake force applied on the vehicle wheels is distributed such that an increased brake efficiency may be obtained, and the approaching instability condition may be avoided.

In an embodiment of the present disclosure, the second brake force is based on one or more vehicle operating parameters and the detected instability condition.

The detected instability condition may here refer to the type and magnitude of the instability. By considering relevant vehicle operating parameters and the detected instability condition, the applied brake force may be distributed to keep the operating parameters within their specified operating ranges on the coming road section. Hereby the approaching instability condition may be avoided.

In an embodiment of the present disclosure, the method further comprising:

reducing the total requested brake force applied to the vehicle when the transfer of the at least a part of the first brake force applied to the vehicle by the auxiliary brake system is insufficient to overcome the detected instability condition.

Reducing the total requested brake force applied to the vehicle may impact the speed of the vehicle. However, such a deviation from a requested speed during the duration of the detected instability condition may be allowed within certain limits to increase the vehicle stability. The brake force may be increased again to the requested brake force level when the road condition changes such that no instability condition is detected.

In an embodiment of the present disclosure, the transfer of the at least a part of the first brake force is initiated at a distance to the coming road section, the distance being based on one or more vehicle operating parameters and the detected instability condition.

A redistribution of the brake force applied by an auxiliary brake systems may involve a significant response time depending on the specific system. By initiating the brake force transfer at a distance to the coming road section, the redistribution of the brake force may be done before the instability condition occurs. By taking into consideration the relevant vehicle operating parameters and the detected instability condition the distance at which the redistribution needs to be initiated may be determined in a precise way resulting in a proactive and smooth redistribution of the brake force. Hereby, the applied brake force, and thereby the vehicle speed may be maintained at the required level even when an instability condition is detected.

In an embodiment of the present disclosure, the vehicle operating parameters in the coming road section is one or more of:

an information related to the coming road section;

the first brake force;

a configuration of the vehicle.

The operating parameters may be determined in the vehicle control system and used to predict an occurrence of an instability condition.

In an embodiment of the present disclosure, the initiating of the transfer of the at least a part of the first brake force comprises:

alerting the vehicle operator of the detected instability condition associated with the coming road section.

Such an alert may for example comprise a recommendation to reduce the auxiliary brake force. Alerting the vehicle operator on a possible upcoming instable situation may be favorable when some of the vehicle operating parameters related to coming road conditions are difficult to predict. The vehicle operator may for example decide whether it is suitable or not to deactivate or reduce the auxiliary brake prior to a situation with high risk for instability. Hereby, the risk for instable vehicle situation may be reduced also when future road conditions cannot be exactly determined.

In an embodiment of the present disclosure, the method further comprises when the instability condition is no longer present:

controlling the auxiliary brake system to increase the applied brake force while controlling the foundation brake system such that the total requested brake force is applied to the vehicle.

The auxiliary brake force may thus be based on the current road conditions. When the road conditions change over time, the method is able to adapt the auxiliary brake operation in an automated fashion. Hereby, unnecessary wear on the foundation brake system is avoided and an increased energy recovery is obtained in the case of electric machine braking leading to increased safety and braking efficiency.

According to a second aspect, the present disclosure relates to a control arrangement configured to control a brake system in a vehicle, the vehicle comprising an auxiliary brake system configured to apply a brake force to at least one first wheel of the vehicle and a foundation brake system configured to apply a brake force to at least one second wheel of the vehicle, the control arrangement being configured to, when a first brake force is applied to the vehicle by means of the auxiliary brake system and when an indication of an instability condition associated with a coming road section is detected:

initiate a transfer of at least a part of the first brake force applied to the vehicle by the auxiliary brake system to, instead, be applied by the foundation brake system prior to reaching the coming road section.

It will be appreciated that all the embodiments described for the method aspects of the present disclosure are applicable also to at least one of the control arrangement aspects of the present disclosure. Thus, all the embodiments described for the method aspects of the present disclosure may be performed by the control arrangement, which may also be a control device, i.e. a device. The control arrangement and its embodiments have advantages corresponding to the advantages mentioned above for the methods and their embodiments.

According to a third aspect of the present disclosure, aforementioned and further objectives are achieved through a vehicle comprising the control arrangement of the second aspect.

According to a fourth aspect, the present disclosure relates to a computer program comprising instructions which, when the program is executed by a computer, cause the computer to carry out the method according to the first aspect.

According to a fifth aspect, the present disclosure relates to a computer-readable medium comprising instructions which, when executed by a computer, cause the computer to carry out the method according to the first aspect.

BRIEF DESCRIPTION OF THE DRAWINGS

Embodiments of the present disclosure will be illustrated in more detail below, along with the enclosed drawings, where similar references are used for similar parts, and where:

FIG. 1 shows an example vehicle, in which embodiments of the present disclosure may be implemented.

DETAILED DESCRIPTION

Figure 2A:
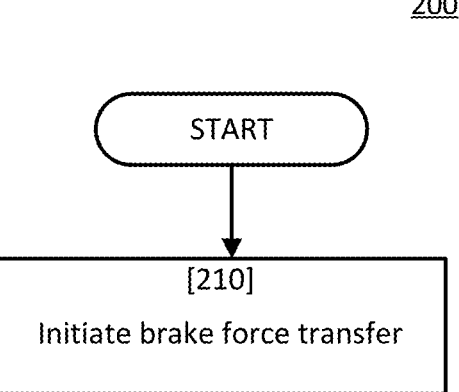
FIG. 2a shows a flow chart of a method for controlling a brake system in a vehicle according to embodiments of the present disclosure.

As previously explained, auxiliary brakes are often used in heavy vehicles as a supplement to the vehicle's primary brake system in situations when a brake force is required during prolonged time periods, for example when driving downhill, to reduce the wear of the primary brakes, avoid problems related to overheating and/or for energy saving purposes. A high utilization of auxiliary brakes is often advantageous.

As an auxiliary brake only acts on the vehicles driven axle/axles, stability issues can occur leading to undesired events especially in slippery conditions and when lateral acceleration is required.

It is therefore an objective of the present disclosure to provide a method and a control arrangement to control a brake system in a vehicle, such that these problems are at least partly solved.

Figure 1:
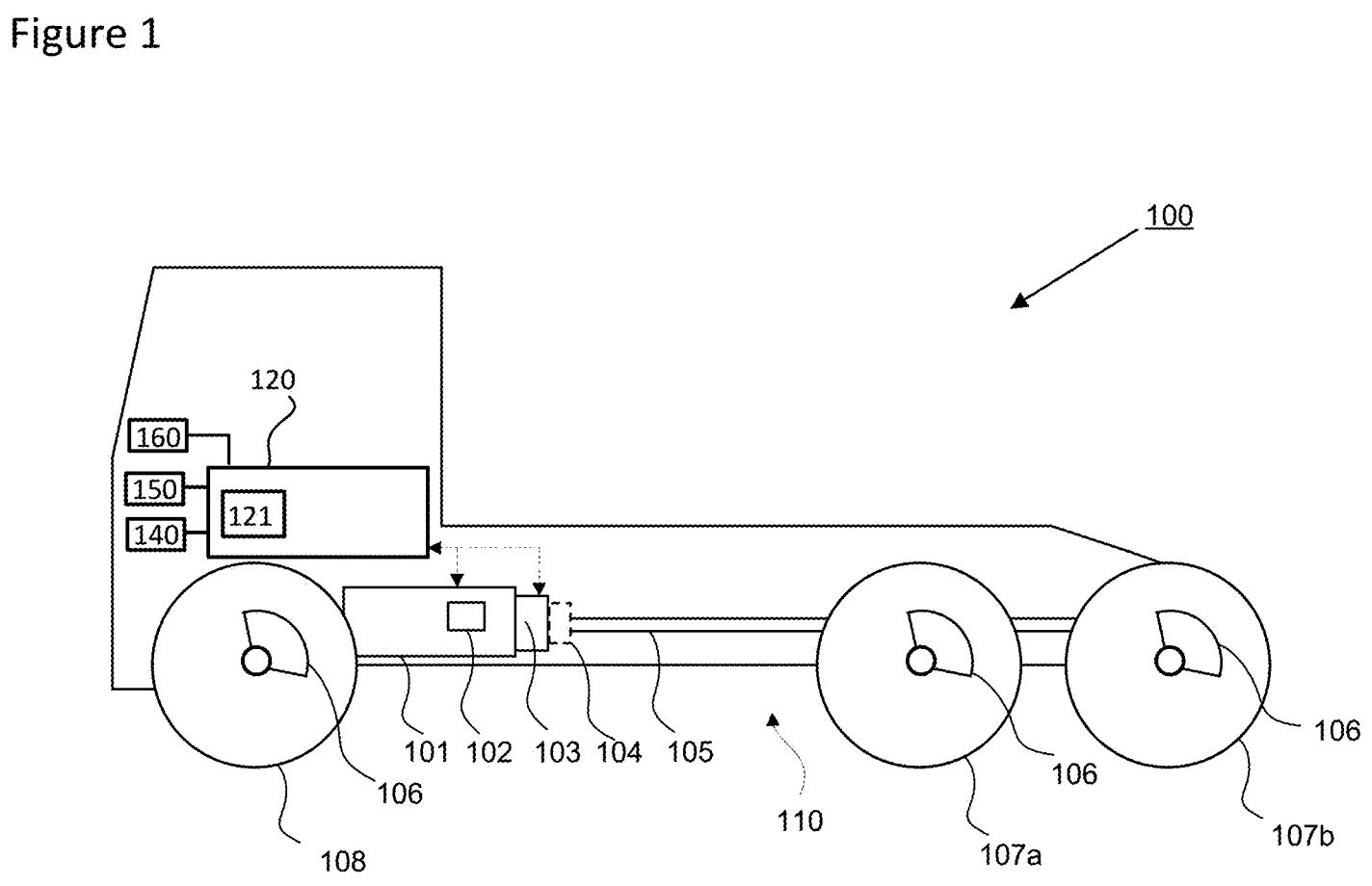

FIG. 1 schematically shows a side view of an exemplary vehicle 100, here illustrated as a truck. Although not illustrated in FIG. 1, the vehicle 100 may be equipped with a trailer. The vehicle may alternatively be a car. It should be noted that only the units/devices/entities of the vehicle 100 useful for understanding the present disclosure are illustrated in FIG. 1. The vehicle 100 in FIG. 1 comprises a powertrain 110 comprising at least one propulsion unit 101 configured for providing torque to one or more wheels 107a, 107b, 108 of the vehicle 100. Although, only the wheels 107a, 107b, 108 on one side of the vehicle 100 are illustrated in FIG. 1, it is to be understood that the vehicle 100 may have fewer or more wheels that than what is shown in FIG. 1. The vehicle 100 comprises at least one pair of drive wheels 107a, 107b and at least one second pair of wheels 108. A wheel pair refers to two wheels that are connected to the same wheel axle.

The propulsion unit 101 may include a combustion engine which, in a customary fashion, may be connected to a gearbox 103. The gearbox may be connected to the drive wheels 107a, 107b of the vehicle drive axle(s) via an output shaft 105 of the gearbox 103 and drive shaft (not illustrated). In addition to the propulsion unit 101 comprising a combustion engine, the vehicle 100 may include one or more electrical machines for driving drive wheels 107a, 107b of the vehicle 100 and may thus for example be a so-called hybrid vehicle.

In another example, the propulsion unit 101 may include only electrical machines for driving the drive wheels 107a, 107b on the vehicles drive axles, whereby the vehicle 100 may be a pure electrical vehicle. The one or more electrical machines may be arranged essentially anywhere along the powertrain 110, as long as torque is provided to the drive wheels 107a, 107b as is understood by a skilled person. It should be understood that the vehicle 100 may be arranged in any known way, for example without the gearbox 103 illustrated in FIG. 1 without limiting the scope of the present disclosure.

The vehicle may comprise a foundation brake system 106 constituting the vehicles primary brake system. The foundation brake system 106 may be a friction brake system, such as e.g., wheel brakes arranged at the vehicles drive wheels 107a, 107b as well as at non driven wheels 108 of the vehicle 100. The vehicle may further comprise as least one auxiliary brake system 102 with a brake force that is dependent on the speed of the propulsion unit 101 and/or an engaged gear of the gearbox 103. Example of such auxiliary brake systems 102 is engine brake system which may relate to a brake system which utilizes the propulsion unit 101 of the vehicle 100 to provide a brake force and thereby slowing down the vehicle 100. Thus, the engine brake system may, for example, include a compression release brake system and an exhaust brake system in case the vehicle comprises a combustion engine. The vehicle may optionally comprise an auxiliary brake system 102 with a brake force independent of the speed of the propulsion unit 101, such as a retarder. Such a retarder 104 may, for example, be connected to an output shaft of the gearbox 103 as illustrated in FIG. 1. Alternatively, the retarder 104 may be connected to a shaft of the propulsion unit 101. Typically, the auxiliary brake system 102 may provide direct brake force only to the vehicle drive wheels 107a, 107b.

Furthermore, the engine brake system may comprise a regenerative brake system in case the vehicle 100 comprises an electric machine. In a regenerative brake system, the electric machine is operated as a generator whereby kinetic energy of the vehicle 100 may be converted to electrical energy and thereby slow down the speed of the vehicle.

The powertrain 110 and its components may be controlled by the vehicle's control system(s) via at least one control arrangement 120 in which the present disclosure may be implemented. The at least one control arrangement 120 may be, for example, responsible for automatically controlling the speed of the vehicle 100 by controlling the brake systems of the vehicle 100.

The control arrangement 120 may be distributed on several control units configured to control different parts of the vehicle 100. The control arrangement 120 may e.g. include a unit 121 configured to initiate a brake force transfer arranged for performing the method steps of the present disclosure as is explained further. The control arrangement 120 will be described in further detail in FIG. 6.

The vehicle 100 may further include at least one sensor 140, e.g. a camera located at suitable positions within the vehicle 100.

Further, the vehicle 100 may comprise a positioning system/unit 150. The positioning unit 150 may be based on a satellite navigation system such as the Navigation Signal Timing and Ranging Navstar, Global Positioning System GPS, Differential GPS DGPS, Galileo, GLONASS, or the like. Thus, the positioning unit may comprise a GPS receiver.

The vehicle may also comprise presentation means 160 adapted for presenting information to the vehicle operator. The presentation means may be provided for communication with the control arrangement 120. Said presentation means may comprise a display and or loudspeaker equipment and may for example be fitted in an instrument panel in the vehicle or arranged in any other conventional way.

The proposed solution will now be described with reference to FIG. 2a which shows a flow chart of a method 200 performed by a control arrangement, such as the control arrangement 120 illustrated in FIG. 1 for controlling a speed of a first vehicle, such as the vehicle 100 illustrated in FIG. 1. The control arrangement 120 is configured to control a brake system in a vehicle 100. The vehicle 100 comprises an auxiliary brake system 102 configured to apply a brake force to at least one first wheel 107a, 107b of the vehicle and a foundation brake system 106 configured to apply a brake force to at least one second wheel 108 of the vehicle.

The method is executed when a first brake force is or is to be applied to the vehicle by means of the auxiliary brake system 102 and when an indication of an instability condition associated with a coming road section is detected.

According to previously known methods, when an instability condition is detected or encountered, the speed of the vehicle 100 needs to be decreased to avoid an unwanted instability event in the coming road section. Such a speed decrease may, e.g., be performed by the vehicle operator increasing the applied brake force. This results in the disadvantage that the required vehicle speed cannot be maintained. Moreover, situations where the vehicle operator is not even aware of the approaching instability condition may result in sudden heavy braking when the instability condition is suddenly detected, risk of dangerous instability events and risk of loss of control over the vehicle 100.

The method according to the present disclosure initiates instead, in step 210, a transfer of at least a part of the brake force applied by the auxiliary brake force upon the detection of the approaching instability condition. During the transfer, at least a part of the first brake force applied to the vehicle by the auxiliary brake system 102 is instead applied by the foundation brake system 106 prior to reaching the coming road section, to overcome the detected instability condition. In this way the brake force applied to the vehicle 100 by means of the auxiliary brake system 102 is, as previously explained, re-distributed over more wheels than those used for auxiliary brakes. When the auxiliary brake force is re-distributed, the total brake force may be applied over the at least one first wheel 107a, 107b as well as over the at least one second wheel 108 which may increase the stability of the vehicle 100 in the coming road section where the instability condition is detected. Moreover, by re-distributing the brake force over more vehicle wheels prior to the coming road section, the instability event may be avoided without the need of decreasing the speed of the vehicle 100.

Figure 2B:
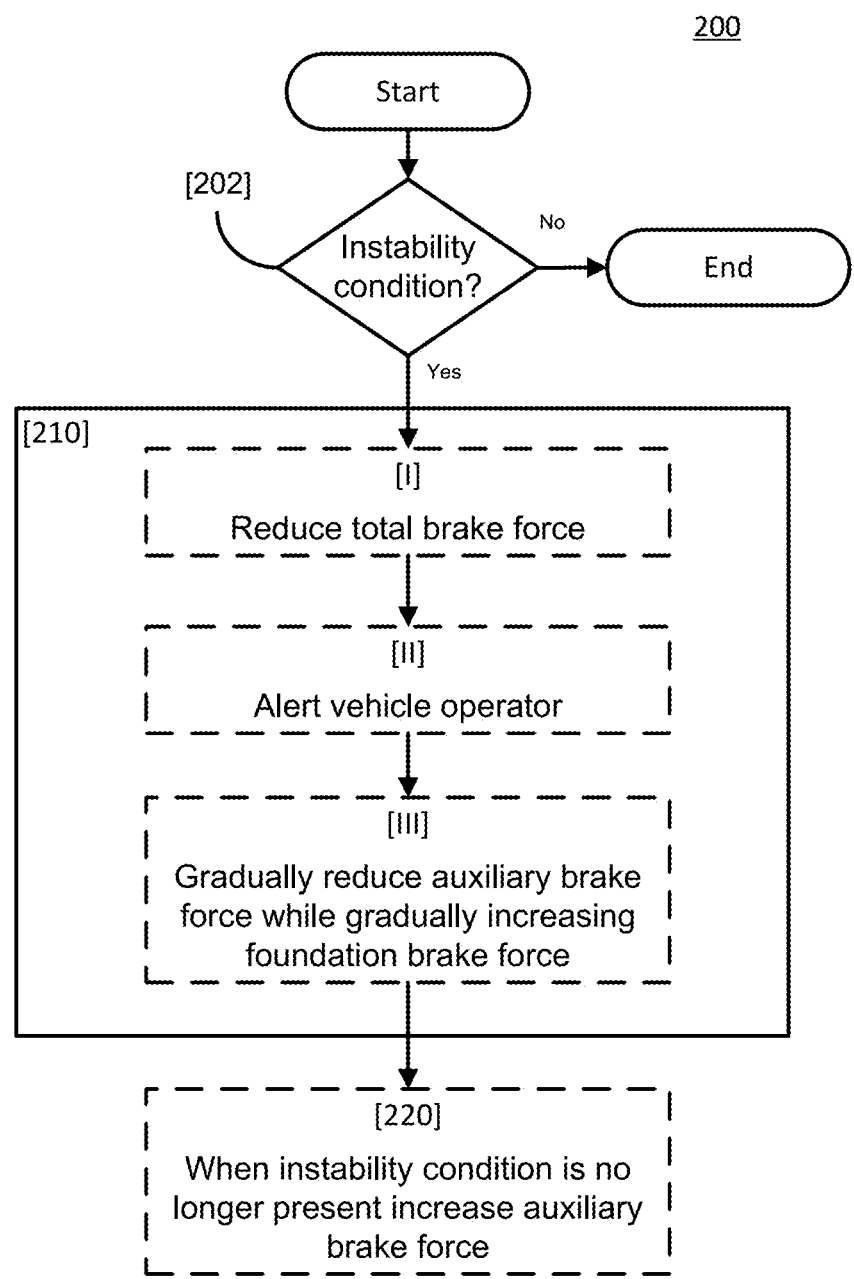
FIG. 2b shows a flow chart of a method for controlling a brake system in a vehicle according to further embodiments of the present disclosure.

In addition to the method step 210 illustrated in FIG. 2a, the method 200 may, comprise optional steps as shown by the dotted boxes in FIG. 2b. Aspects of the present disclosure will be explained in more detail with reference to FIG. 2b as well as FIGS. 3-5. It should be noted that the method steps illustrated in FIG. 2b and described herein do not necessarily have to be executed in the order illustrated in FIG. 2b. The steps may essentially be executed in any suitable order, as long as the physical requirements and the information needed to execute each method step is available when the step is executed.

As previously explained, the method starts when a first brake force is or is to be applied to the vehicle 100 by means of the auxiliary 102 brake system. The first brake force may be applied according to conventional methods. The first brake force may, for example, be applied to the vehicle automatically by means of a speed control function maintaining a set vehicle speed. Today, many vehicles are equipped with look ahead functionality allowing a precise determination of future brake force requirements based on current and future driving conditions and estimating the forces applied on the vehicle on an approaching road section. Alternatively, the first brake force may be applied manually by the vehicle operator. The present disclosure is thus not limited to any particular method of determining/estimating the first brake force.

The method of the present disclosure is performed when an instability condition associated with a coming road section is detected in step 202 in FIG. 2b.

In an embodiment, the instability condition may be detected based on a vehicle operating parameter such as, e.g., the condition of the road ahead of the vehicle 100 and the required vehicle brake force associated with that road section, i.e. the first brake force. As previously explained, the instability condition associated with a coming road section may be detected when there is a risk that an undesired event impacting the stability of the vehicle will occur when the first brake force is applied by means of the auxiliary brake system 102 on that road section. Such an undesired event may involve loss of traction between one or more wheels and the road surface which may reduce the brake efficiency and increase the risk of loss of control over the vehicle. The instability condition may be detected by e.g. estimating the wheel slip of one or more wheels of the vehicle. If the wheel slip is estimated to exceed a predetermined allowed wheel slip limit on a section of the road, an instability condition associated with that road section is determined. The predetermined allowed wheel slip limit may in one example be preconfigured in the control system of the vehicle 100. If, for example, the road ahead of the vehicle comprises a curve requiring a lateral vehicle acceleration or a slippery road surface caused by snow, ice, mud or the like, the wheel slip may increase and exceed the predetermined allowed wheel slip limit. In situations where road conditions of the coming road section are hard to predict, i.e. due to poor visibility, an instability condition may be predicted based on e.g., weather forecasts or map data.

Moreover, the instability condition may be detected taking into consideration the configuration of the vehicle. The vehicle configuration may comprise information related to the configuration of the vehicle wheel axles such as the number of controllable wheels axles and their location, i.e., driven or undriven wheel axles which are steerable, the number and the location of retractable wheel axles, load displacement and driven axle load information, and/or trailer configuration affecting the vehicle's lateral stability. The vehicle configuration may for example be taken into consideration when configuring the allowed maximum wheel slip limit.

When an instability condition is detected/anticipated in front of the vehicle, the method of the present disclosure redistributes the brake force applied on the vehicle to be applied on additional wheels and wheel axles of the vehicle.

If an instability condition associated with a coming road section is detected in step 202, i.e., "Yes" in FIG. 2*b*, the method 200 continues to step 210. Otherwise, i.e., "No" in FIG. 2*b*, the method ends.

In step 210, in FIG. 2*b*, the transfer of at least a part of the first brake force applied to the vehicle 100 by the auxiliary brake system 102 is initiated as described with reference to FIG. 2*a*. Thus, at least a part of the first brake force is instead to be applied by the foundation brake system 106 prior to reaching the coming road section to overcome the detected instability condition. In embodiments, the initiation of the transfer of the brake force may be performed by one or more of the optional steps I, II and/or III in FIG. 2*b*.

In the optional step I in FIG. 2*b*, the total requested brake force applied to the vehicle 100 may, in an embodiment, be reduced when the transfer of the at least a part of the first brake force applied to the vehicle 100 by the auxiliary brake system 102 is insufficient to overcome the detected instability condition as will be explained further with reference to FIG. 4.

In the optional step II in FIG. 2*b*, the vehicle operator may be alerted of the detected instability condition associated with the coming road section. Such alert may take place according to conventional methods, for example via the presentation means 160. Alerting the driver on a possible upcoming instable situation may be beneficial, for example when road conditions are hard to predict. The alert may, for example, comprise a recommendation to the vehicle operator to manually reduce the auxiliary brake force prior to the situation with high risk of instability. Moreover, the alert may comprise a recommendation to the vehicle operator to manually reduce the total requested brake force applied to the vehicle 100 when the transfer of the at least a part of the first brake force applied to the vehicle 100 by the auxiliary brake system 102 is insufficient to overcome the detected instability condition.

Figure 3:
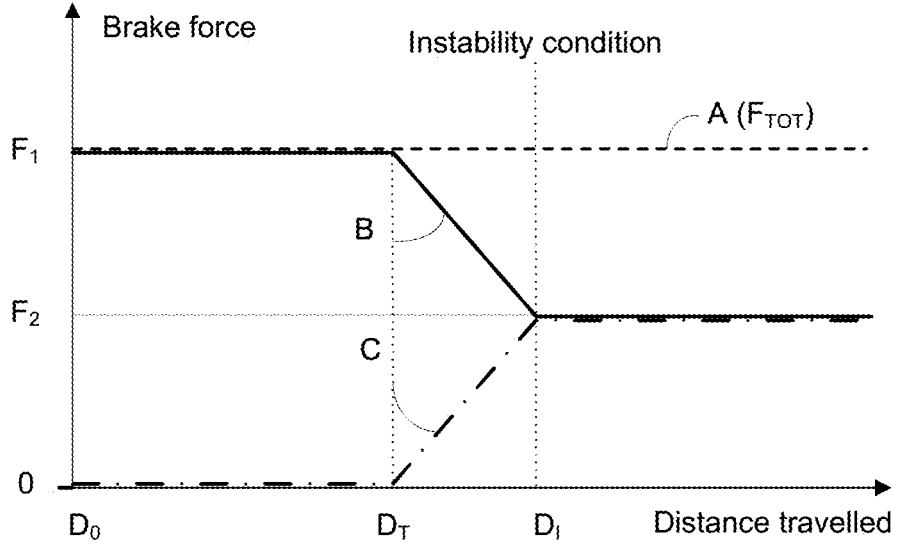
FIG. 3 is a schematic illustration of controlling a brake system in a vehicle according to embodiments of the present disclosure.

In an embodiment, the initiating of the transfer of the brake force may comprise, in the optional step III, controlling the auxiliary brake system 102 to gradually reduce the applied first brake force while controlling the foundation brake system 106 to apply a gradually increased brake force. Such control of the auxiliary brake system 102 and the foundation brake system 106 may be performed automatically prior to the coming road section as illustrated in FIG. 3. When the optional step III is preceded by the above described step II, such control may be carried out manually by the vehicle operator.

In an optional step 220 in FIG. 2*b*, executed when the instability condition is no longer present, the auxiliary brake system 102 may, in an embodiment, be controlled to increase the applied brake force while controlling the foundation brake system 106 such that the total requested brake force is applied to the vehicle 100. The instability condition is no longer present when the road section associated with the detected instability condition has been passed. It is to be understood that the magnitude of the brake force transferred from the foundation brake system 106 back to the auxiliary brake system 102 may depend on the current and coming road conditions. Thus, when the instability condition is no longer present, at least a part of the brake torque transferred to the foundation brake system 106 due to the previously detected approaching instability condition can again be gradually transferred back to the auxiliary brake system 102 in a safe and controlled manner without risk for the vehicle entering into an undesired instability event as is illustrated in FIG. 5.

Figure 4:
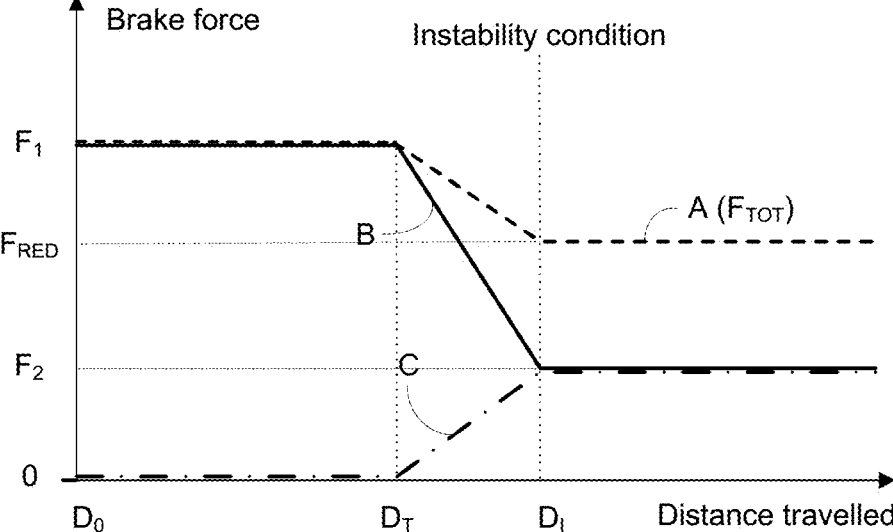
FIG. 4 is a schematic illustration of controlling a brake system in a vehicle according to further embodiments of the present disclosure.
Figure 5:
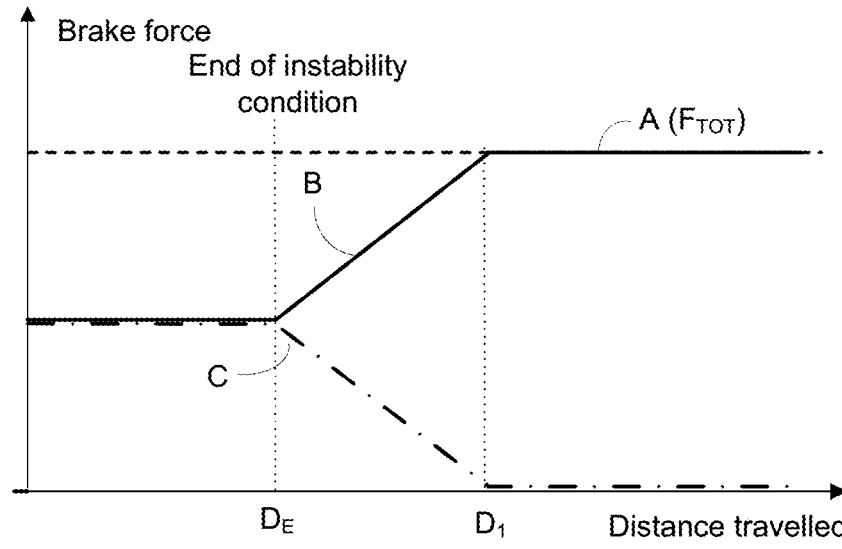
FIG. 5 is a schematic illustration of controlling a brake system in a vehicle according to further embodiments of the present disclosure.

FIGS. 3-5 comprise graphs illustrating example operations by the proposed brake system control in the vehicle 100. The graphs show, in plots A, B and C the requested brake force and the brake force applied the vehicle 100 in a driving situation. Graph A shows the total brake force $F_{TOT}$ applied to the vehicle 100. The total brake force in the vehicle 100 having a plurality of brake systems, is the cumulative brake force generated by all the individual brake systems working together to slow down or stop the vehicle 100. The road section may, for example be a downhill road section and the total brake force may be applied to maintain a required vehicle speed on the road section. Graph B shows the brake force applied by the auxiliary brake system 102. Such brake force may be applied to the drive wheels 107*a*, 107*b* of the vehicle. Such drive wheels may be situated on one or more drive axles of the vehicle 100. The graph C shows the brake force applied by the foundation brake system 106. Such brake force may be applied to one or more wheels 108 other than the drive wheels 107*a*, 107*b*. The one or more wheels 108 may be situated on one or more non-driven axles of the vehicle 100.

FIG. 3 shows one example of the brake system control in a vehicle according to embodiments of the present disclosure. Here, the total brake force applied to the vehicle corresponds to the first brake force $F_1$ applied by the auxiliary brake system 102 at the current vehicle position $D_0$. As long as no instability condition has been detected no brake torque is applied by the foundation brake system 106. It is to be understood that the present disclosure is not limited to the example illustrated in FIG. 3. The total brake force may for example be distributed between the auxiliary brake system 102 and the foundation brake system 106 prior to determining an instability condition without limiting the scope of the present disclosure. In the example illustrated in FIG. 3, an instability condition related to a coming road section is detected. The instability condition is determined to occur at the travelled distance $D_I$ from the vehicle's current position $D_0$. The instability condition may for example comprise the beginning of a curve or the beginning of a slippery road section. Based on the detected instability condition, a transfer of the brake force applied by the auxiliary brake system 102 is initiated at the travelled distance $D_T$, i.e., prior to reaching the distance $D_I$. During the transfer, the auxiliary brake system 102 is controlled to gradually reduce the applied first brake force while controlling the foundation brake system 106 to apply a gradually increased brake force as illustrated in FIG. 3 between the distance $D_T$ and $D_I$. The stability of the vehicle increases in response to the brake being gradually transferred from being applied on the at least one first wheel 107*a*, 107*b* to also being applied to the at least one second wheel 108 and the risk of an undesired instability event is reduced.

In an embodiment, the auxiliary brake system 102 may be controlled to gradually reduce the applied first brake force $F_1$ to a second brake force $F_2$ such that the second brake force $F_2$ is applied prior to or when reaching the coming road section at the distance $D_I$ in FIG. 3. Thus, the auxiliary brake system 102 may be controlled to apply the second brake force $F_2$ prior to or when reaching the coming road section at the distance $D_I$ in FIG. 3. Moreover, the foundation brake system 106 may be controlled to apply a brake force such that a total requested brake force $F_{TOT}$ is applied to the vehicle 100. In other words, prior to or when reaching the coming road section at the distance $D_I$ in FIG. 3, the brake force applied by the foundation brake system 106 may correspond to the difference between the total requested brake force $F_{TOT}$ and the second brake force $F_2$ applied by the auxiliary brake system 102.

In an embodiment, the second brake force $F_2$ may be based on one or more vehicle operating parameters and the detected instability condition. This means that the allowed auxiliary brake force that may be applied during the instability condition is estimated/calculated. The method of the present disclosure may, for example, determine the allowable auxiliary brake force such that the wheel slip magnitude below the configured wheel slipe magnitude limit. The method of the present disclosure may for example select the second brake force $F_2$ such that the brake force applied by the auxiliary brake during the instability condition is maximized to reduce the need of using the foundation brake system. By maintaining as a high auxiliary brake force as possible the wear on the foundation brake system 102 as well as the risk of overheating of the foundation brake is reduced. Moreover, increased energy recovery may be achieved in the case when the auxiliary brake system is an electric machine 101.

FIG. 4 illustrates a driving scenario where a transfer of first brake force $F_1$ applied by the auxiliary brake system 102 is insufficient to overcome the detected instability condition. This means that the total brake force $F_{TOT}$ cannot be safely engaged by the auxiliary brake system 102 nor by any combination of the auxiliary brake system 102 and the foundation brake system 106 without subjecting the vehicle 100 to an undesired instability event. Here the total brake torque is reduced, as previously explained with reference to step I in FIG. 2b, from the level corresponding to the first brake force $F_1$ to a level corresponding to a reduced brake force $F_{RED}$ in FIG. 4. The reduction of the total brake force may here be done prior to the detected instability condition at the distance $D_I$. The total brake force may be reduced such that an instability event may be avoided. Thus when the first brake force $F_1$ applied by the auxiliary brake system 102 is gradually decreased to the second brake force $F_2$, the foundation brake system 106 is controlled to apply a brake force such that the total reduced brake force $F_{TOT}$ is applied to the vehicle 100.

In an embodiment, the transfer of the at least a part of the first brake force may be initiated at a distance $D_T$ to the coming road section as illustrated in FIG. 3 and in FIG. 4. The distance may be based on one or more vehicle operating parameters and the detected instability condition. The method of the present disclosure may, for example, determine the duration required to transfer the brake force and initiate the transfer of the brake force such that the transfer is completed prior to or when reaching the coming road section.

According to the present disclosure, the brake force applied by the auxiliary brake system 102 is reduced from the first brake force $F_1$ to the second brake force $F_2$ prior to or when reaching the coming road section. In the same manner, the brake force applied by the foundation brake system 106 is increased to correspond to the difference between the total requested brake force $F_{TOT}$ and the second brake force $F_2$. This means that the brake force applied to different wheel axles and different wheels of the vehicle is redistributed. The magnitude of brake force applied on a vehicle wheel depends on which brake system applies a brake force on the wheel and the magnitude of brake force applied by each brake system. As previously explained, the auxiliary brake system 102 is configured to apply a brake force to at least one first wheel 107a, 107b of the vehicle and the foundation brake system 106 is configured to apply a brake force to at least one second wheel 108 of the vehicle 100.

In an embodiment, the foundation brake system 106 may be further configured to apply a brake force to the at least one first wheel 107a, 107b. Thus, both the auxiliary brake system 102 and the foundation brake system 106 may apply a brake force to the at least one first wheel 107a, 107b.

In the case the auxiliary brake force can only be controlled in discrete steps and when the auxiliary brake force applied to the at least one first wheel 107a, 107b becomes too high, it may be at least partially replaced by a foundation brake force acting on those wheels. Moreover, in the case when the storage capacity of the energy storage in the vehicle is soon to reach its maximum, the auxiliary brake force applied to the at least one first wheel 107a, 107b might be reduced and replaced by a foundation brake force acting on those wheels.

FIG. 5 illustrates a driving scenario following the one illustrated in FIG. 3 or FIG. 4. Here, as previously explained with the reference to FIG. 3 and FIG. 4, a part of the brake force applied by the auxiliary brake system 102 has been transferred to the foundation brake system 106 based on a detected instability condition. The brake force is then maintained as long as the instability condition is present. At the distance $D_E$, the instability condition ends and is no longer present. The brake torque can be gradually transferred over from the foundation brake system 106 to the auxiliary brake system 102 starting at the distance $D_E$ and continuing until the distance $D_1$. Thus, at the distance $D_1$ the auxiliary brake system 102 is fully engaged at the requested torque level $F_{TOT}$.

As previously explained, the present disclosure uses a number of vehicle operating parameters to determine whether an instability condition is approaching, the magnitude of auxiliary brake force that may be applied to the vehicle in the road section where the instability condition applies, i.e., the second brake force $F_2$, as well as when deciding where the transfer of the brake force is to be initiated. In an embodiment of the present disclosure, as previously explained, the vehicle operating parameters in the coming road section may be one or more of an information related to the coming road section, the first brake force $F_1$ and the configuration of the vehicle.

The information related to the coming road section may for example comprise information related to the road conditions on the coming road section such as road surface friction, road inclination, road curvature and the radius of an approaching curve as well as the visibility conditions. Such information related to the coming road section may be obtained in the vehicle control system according to any conventional method for example on the basis of map data, e.g., from digital maps containing topographical information, in combination with positioning information, e.g., GPS information. The positioning information may be used to determine the location of the vehicle relative to the map data so that the road inclination can be extracted from the map data. Various present-day cruise control systems use map data and positioning information. Such systems may then provide the map data and positioning information required for the method according to the present disclosure, thereby minimizing the additional complexity involved in determining the road inclination. Such information may alternatively or furthermore be based on weather reports and/or information obtained from one or more sensors 140 in the vehicle, such as a temperature sensor, radar information, camera information, or information from another vehicle. It may also be retrieved from positioning information and road topology/topography information stored previously on board, or from information obtained from traffic systems related to the expected travelling route. In systems where there is information exchange between vehicles, information related to the coming road section estimated by one vehicle may also be made available to other vehicles, either directly or via an intermediate unit such as a database or the like.

Other vehicle operating parameters like the first brake force $F_1$ and the configuration of the vehicle may be obtained from the vehicle's control system via one or more communication buses linking the control arrangement 120 with various components and controllers located in the vehicle. The configuration of the vehicle may comprise information related to wheel axle configuration such as the number of controllable wheels axles and their location, the number and the location of retractable wheel axles, load displacement and driven axle load information, and/or trailed configuration affecting the vehicle's lateral stability.

According to an aspect of the present disclosure, a control arrangement 120 for controlling a brake system in a vehicle 100 is presented. The vehicle 100 comprises an auxiliary brake system 102 configured to apply a brake force to at least one first wheel 107a, 107b of the vehicle and a foundation brake system 106 configured to apply a brake force to at least one second wheel 108 of the vehicle.

The control arrangement 120 includes means 121 arranged to, when a first brake force is applied to the vehicle 100 by means of the auxiliary brake system 102 and when an indication of an instability condition associated with a coming road section is detected, initiate a transfer of at least a part of the first brake force applied to the vehicle by the auxiliary brake system 102 to, instead, be applied by the foundation brake system 106 prior to reaching the coming road section.

The control arrangement 120, e.g. a device or a control device, according to the present disclosure, may be arranged for performing all of the above, in the claims, and in the herein described embodiments method steps. The control arrangement 120 is hereby provided with the above described advantages for each respective embodiment. The present disclosure is also related to a vehicle 100 including the control arrangement 120.

Figure 6:
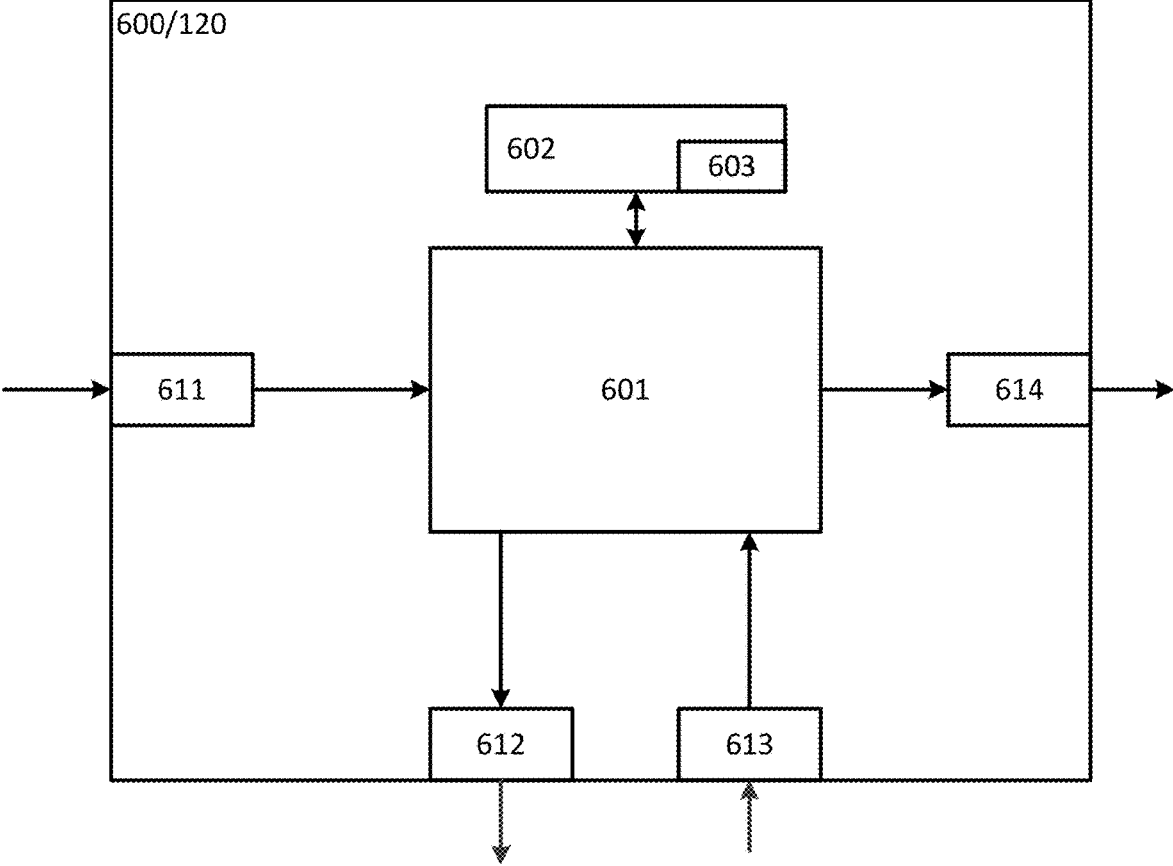
FIG. 6 shows a control arrangement, in which a method according to any one of the herein described embodiments may be implemented.

Now turning to FIG. 6 which illustrates the control arrangement 600/120, which may correspond to or may include one or more of the above-mentioned control unit 121, i.e. the control unit performing the method steps of the present disclosure. The control arrangement 600/120 comprises a computing unit 601, which can be constituted by essentially any suitable type of processor or microcomputer, e.g. a circuit for digital signal processing (Digital Signal Processor, DSP), or a circuit having a predetermined specific function (Application Specific Integrated Circuit, ASIC). The Computing unit can thus comprise any hardware or hardware/firmware device implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit, or any other device capable of electronically performing operations in a defined manner. The computing unit 601 is connected to a memory unit 602 arranged in the control arrangement 600/120, which memory unit provides the computing unit 601 with, e.g., the stored program code and/or the stored data which the computing unit 601 requires to be able to perform computations. The computing unit 601 is also arranged to store partial or final results of computations in the memory unit 602.

In addition, the control arrangement 600/120 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing unit 601 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network CAN bus, a Media Orientated Systems Transport MOST bus, or some other bus configuration; or by a wireless connection. A person skilled in the art will appreciate that the above-stated computer can be constituted by the computing unit 601 and that the above-stated memory can be constituted by the memory unit 602. Thus the above-stated computer and the above-stated memory may be comprised in the control arrangement 600/120.

Control systems in modern vehicles commonly comprise communication bus systems consisting of one or more communication buses for linking a number of electronic control units, ECU's, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 6, which is well known to the person skilled in the art within this technical field.

In a shown embodiment, the present disclosure may be implemented by the one or more control units, such as the above mentioned control unit 121. The present disclosure can also, however, be implemented wholly or partially in one or more other control units already in the vehicle 100, or in some control unit dedicated to the present disclosure.

Here and in this document, units are often described as being arranged for performing steps of the method according to the present disclosure. This also includes that the units are designed to and/or configured to perform these method steps.

The control unit 121 is in FIG. 1 illustrated as one unit. This and other units may, however, be logically separated but physically implemented in the same unit or can be both logically and physically arranged together. These units may e.g. correspond to groups of instructions, which can be in the form of programming code, that are input into, and are utilized by a processor/computing unit 601 when the units are active and/or are utilized for performing its method steps, respectively.

The person skilled in the art will appreciate that the herein described embodiments for controlling a brake system in a vehicle 100 may also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. In some embodiments, the computer-readable medium may be a non-transitory computer-readable medium, such as a tangible electronic, magnetic, optical, infrared, electromagnetic, and/or semiconductor system, apparatus, and/or device. The computer-readable medium comprises a suitable memory, such as, e.g.: Read-Only Memory ROM, Programmable Read-Only Memory PROM, Erasable PROM EPROM, Flash memory, Electrically Erasable PROM EEPROM, a hard disk unit, etc.

The present disclosure is not limited to the above described embodiments. Instead, the present disclosure relates to, and encompasses all different embodiments being included within the scope of the independent claims.

The invention claimed is:

1. A method for a control arrangement configured to control a brake system in a vehicle, the vehicle comprising an auxiliary brake system configured to apply a brake force to at least one first wheel of the vehicle and a foundation brake system configured to apply a brake force to at least one second wheel of the vehicle, the method comprising, when a first brake force is or is to be applied to the vehicle by means of the auxiliary brake system and when an indication of an instability condition associated with a coming road section is detected:

initiating a transfer of at least a part of the first brake force applied to the vehicle by the auxiliary brake system to, instead, be applied by the foundation brake system prior to reaching the coming road section to overcome the detected instability condition, wherein the initiating of the transfer of the brake force comprises controlling the auxiliary brake system to gradually reduce the applied first brake force while controlling the foundation brake system to apply a gradually increased brake force.

2. A method according to claim 1, wherein the instability condition is based on a vehicle operating parameter.

3. A method according to claim 1, wherein the auxiliary brake system is controlled to gradually reduce the applied first brake force to a second brake force such that the second brake force is applied prior to or when reaching the coming road section, the method further comprising prior to or when reaching the coming road section:

controlling the auxiliary brake system to apply the second brake force; and controlling the foundation brake system to apply a brake force such that a total requested brake force is applied to the vehicle.

4. A method according to claim 3, wherein the foundation brake system is further configured to apply a brake force to the at least one first wheel.

5. A method according to claim 3, wherein the second brake force is based on one or more vehicle operating parameters and the detected instability condition.

6. A method according to claim 1, further comprising:

reducing the total requested brake force applied to the vehicle when the transfer of the at least a part of the first brake force applied to the vehicle by the auxiliary brake system is insufficient to overcome the detected instability condition.

7. A method according to claim 1, wherein the transfer of the at least a part of the first brake force is initiated at a distance to the coming road section, the distance being based on one or more vehicle operating parameters and the detected instability condition.

8. A method according to claim 2, wherein the vehicle operating parameters in the coming road section is one or more of:

an information related to the coming road section;

the first brake force; and/or a configuration of the vehicle.

9. A method according to claim 1, wherein the initiating of the transfer of the at least a part of the first brake force comprises:

alerting the vehicle operator of the detected instability condition associated with the coming road section.

10. A method according to claim 1, further comprising when the instability condition is no longer present:

controlling the auxiliary brake system to increase the applied brake force while controlling the foundation brake system such that the total requested brake force is applied to the vehicle.

11. A control arrangement configured to control a brake system in a vehicle, the vehicle comprising an auxiliary brake system configured to apply a brake force to at least one first wheel of the vehicle and a foundation brake system configured to apply a brake force to at least one second wheel of the vehicle, the control arrangement being configured to, when a first brake force is applied to the vehicle by means of the auxiliary brake system and when an indication of an instability condition associated with a coming road section is detected:

initiate a transfer of at least a part of the first brake force applied to the vehicle by the auxiliary brake system to, instead, be applied by the foundation brake system prior to reaching the coming road section, wherein initiation of the transfer of the brake force comprises to control the auxiliary brake system to gradually reduce the applied first brake force while controlling the foundation brake system to apply a gradually increased brake force.

12. A vehicle comprising a control arrangement, configured to control a brake system in a vehicle, the vehicle comprising an auxiliary brake system configured to apply a brake force to at least one first wheel of the vehicle and a foundation brake system configured to apply a brake force to at least one second wheel of the vehicle, the control arrangement being configured to, when a first brake force is applied to the vehicle by means of the auxiliary brake system and when an indication of an instability condition associated with a coming road section is detected:

initiate a transfer of at least a part of the first brake force applied to the vehicle by the auxiliary brake system to, instead, be applied by the foundation brake system prior to reaching the coming road section, wherein initiation of the transfer of the brake force comprises to control the auxiliary brake system to gradually reduce the applied first brake force while controlling the foundation brake system to apply a gradually increased brake force.

13. Computer program product stored on a non-transitory computer-readable medium, said computer program product for controlling a brake system in a vehicle, the vehicle comprising an auxiliary brake system configured to apply a brake force to at least one first wheel of the vehicle and a foundation brake system configured to apply a brake force to at least one second wheel of the vehicle, wherein said computer program product comprising computer instructions to cause one or more control devices to perform the following operation when a first brake force is applied to the vehicle by means of the auxiliary brake system and when an indication of an instability condition associated with a coming road section is detected:

initiate a transfer of at least a part of the first brake force applied to the vehicle by the auxiliary brake system to, instead, be applied by the foundation brake system prior to reaching the coming road section, wherein initiation of the transfer of the brake force comprises to control the auxiliary brake system to gradually reduce the applied first brake force while controlling the foundation brake system to apply a gradually increased brake force.

14. The control arrangement according to claim 11, wherein the instability condition is based on a vehicle operating parameter.

15. The control arrangement according to claim 11, wherein the auxiliary brake system is controlled to gradually reduce the applied first brake force to a second brake force such that the second brake force is applied prior to or when reaching the coming road section, the method further comprising prior to or when reaching the coming road section:

controlling the auxiliary brake system to apply the second brake force; and controlling the foundation brake system to apply a brake force such that a total requested brake force is applied to the vehicle.

16. The control arrangement according to claim 15, wherein the foundation brake system is further configured to apply a brake force to the at least one first wheel.

17. The control arrangement according to claim 15, wherein the second brake force is based on one or more vehicle operating parameters and the detected instability condition.

18. The control arrangement according to claim 11, further comprising:

reducing the total requested brake force applied to the vehicle when the transfer of the at least a part of the first brake force applied to the vehicle by the auxiliary brake system is insufficient to overcome the detected instability condition.

\* \* \* \* \*